June 15, 1926.
A. F. ERICKSON
1,589,058
OIL CUP
Filed April 30, 1924
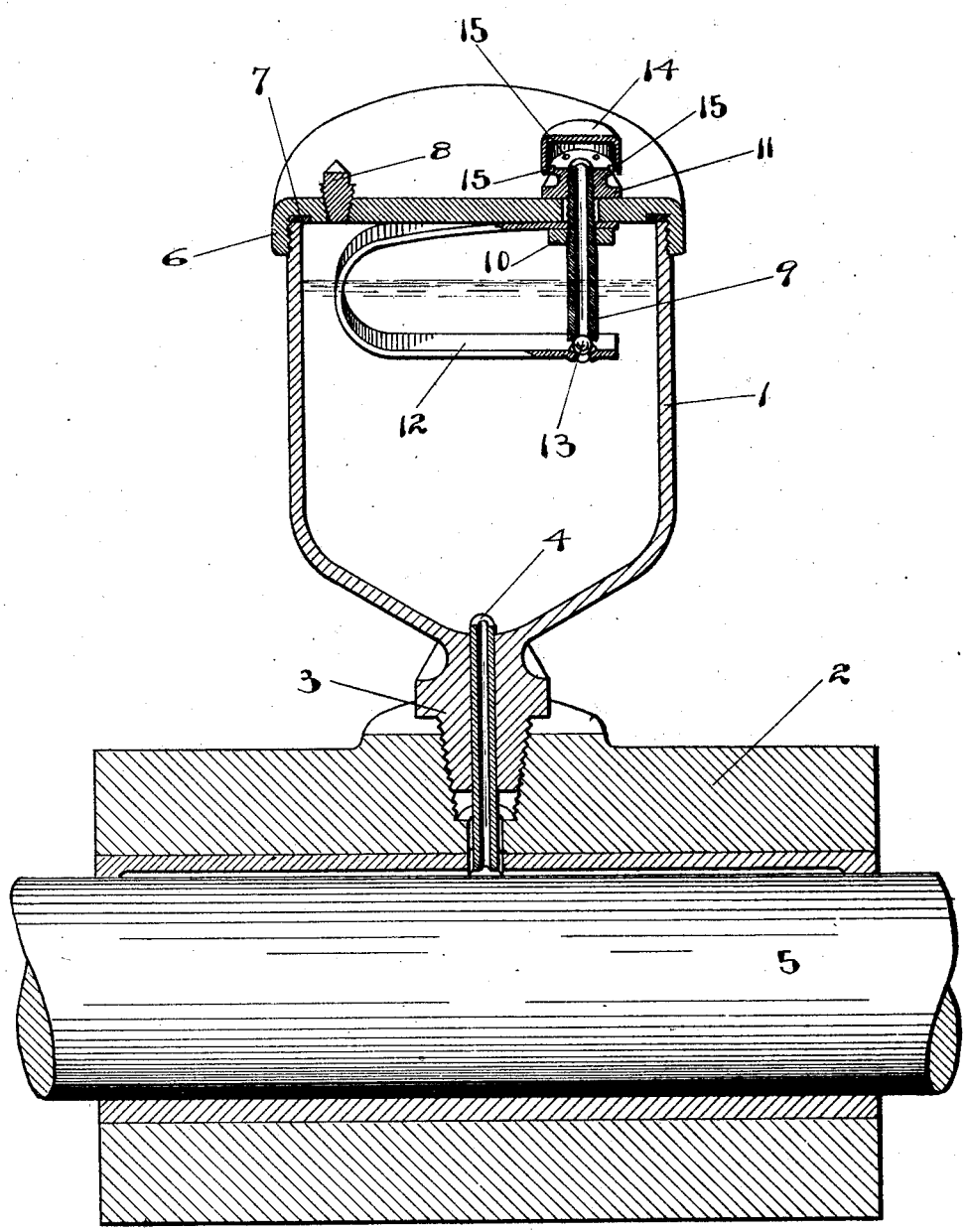
INVENTOR
ARTHUR F. ERICKSON
BY C. F. Blake ATTY Patented June 15, 1926.

1,589,058

UNITED STATES PATENT OFFICE.

ARTHUR F. ERICKSON, OF PORTLAND, OREGON.

OIL CUP.

Application filed April 30, 1924. Serial No. 710,189.

My invention relates to oil cups in general, the object being to provide thermostatically controlled means for feeding the oil from the cup as the bearing to which said oil cup is applied heats up, and for shutting off the supply of oil as said bearing cools down.

I accomplish the above object by means of the construction illustrated in the accompanying drawing, which is a part of this application for Letters Patent, and which is a perspective view of my device.

The oil cup 1 may be of any suitable construction, such as many of those well known in the art, and is conveniently mounted upon the bearing box 2 by a threaded extension 3. A tube 4 is mounted within said extension, and extended sufficiently downward therefrom to carry oil to the shaft 5. The oil cup cap 6 is rendered air tight upon the oil cup by means of a suitable gasket 7, and a filling plug 8 is provided. A tube 9 is mounted upon the cap 6 by means of nuts 10 and 11 so that the vertical position of said tube may be adjusted. Between the nut 10 and the cap 6 a thermostatic unit 12 is mounted upon the tube 9. A ball valve 13 is mounted upon the free end of said thermostatic unit 12, said ball closing the lower end of the tube 9, the thermostatic unit being adjusted so as to form a spring for that purpose.

The nut 11 is provided with a dust cap 14 covering the end of the tube 9 and having ports 15 therein arranged so as to admit air to the tube 9 while excluding dirt therefrom.

When the bearing is running at normal temperature no oil is fed thereto from the oil cup, because the latter is hermetically sealed by the gasket 7, plug 8 and valve 13. As the bearing heats up above the normal temperature thereof, the thermostatic unit expands and opens the valve 13, thus opening communication between the oil cup and the atmosphere through the tube 9 and the ports 15 in the dust cap 14. As the bearing cools down to its normal temperature again because of the resulting flow of oil through the tube 14 thereto, the thermostatic unit 12 contracts and closes the valve 13, thereby again hermetically sealing the oil cup and preventing further flow of oil through the tube 4.

It is obvious that my device provides great economy of oil consumption because only sufficient oil is fed to the bearing to preserve the latter at its normal temperature.

My device may be made of any size, and constructed of any materials deemed convenient and suitable for a device of this character, and while I have illustrated and described a form of construction found desirable in materializing my invention, I wish to include in this application all mechanical equivalents and substitutes that may fairly be considered to come within the scope and purview of my invention as defined in the appended claims.

Having disclosed my invention so that others may be enabled to construct and to use the same, what I claim as new, and desire to secure by Letters Patent is:

1. An air sealed oil cup; a tube within said cup communicating with the atmosphere outside said cup; a valve closing said tube within said cup; and a thermostat upon said tube controlling the action of said valve.

2. An air sealed oil cup; a tube within said oil cup communicating with the atmosphere outside said cup; a ball valve upon the end of said tube within said cup; and a thermostat mounted upon said tube and adapted to contact with said ball valve and control the valve.

3. An air sealed oil cup; a tube within said oil cup communicating with the atmosphere outside said cup; and a thermostatically controlled valve upon said tube within said cup.

In witness whereof I claim the foregoing as my own I hereunto affix my signature at Portland, county of Multnomah, State of Oregon, this 25th day of April, 1924.

ARTHUR F. ERICKSON.